United States Patent
Zhao et al.

(10) Patent No.: US 10,967,865 B2
(45) Date of Patent: Apr. 6, 2021

(54) METHODS AND SYSTEM FOR MANAGING WHEEL CREEP TORQUE OF A VEHICLE

(71) Applicant: Ford Global Technologies, LLC, Dearborn, MI (US)

(72) Inventors: Yanan Zhao, Ann Arbor, MI (US); Jason Meyer, Canton, MI (US); Rajit Johri, Canton, MI (US); Jeffrey Allen Doering, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/518,779

(22) Filed: Jul. 22, 2019

(65) Prior Publication Data

US 2021/0024072 A1    Jan. 28, 2021

(51) Int. Cl.
*B60W 30/18* (2012.01)
*B60W 10/02* (2006.01)

(52) U.S. Cl.
CPC .... *B60W 30/18063* (2013.01); *B60W 10/023* (2013.01); *B60W 10/026* (2013.01)

(58) Field of Classification Search
None
See application file for complete search history.

(56) References Cited

U.S. PATENT DOCUMENTS

| | | | |
|---|---|---|---|
| 9,327,721 B2 | 5/2016 | Johri et al. | |
| 9,573,579 B2 | 2/2017 | Johri et al. | |
| 2013/0292195 A1* | 11/2013 | Gibson | B60W 30/18045 180/53.1 |
| 2013/0311055 A1* | 11/2013 | Whitney | B60W 10/02 701/54 |
| 2015/0099607 A1* | 4/2015 | Yamazaki | B60W 20/10 477/5 |

* cited by examiner

*Primary Examiner* — Justin Holmes
(74) *Attorney, Agent, or Firm* — David Kelley; McCoy Russell LLP

(57) ABSTRACT

Systems and methods for operating a vehicle that includes an engine and an electric machine are described. In one example, electric machine torque is adjusted according to a wheel torque in a wheel torque creep mode where an engine provides torque to vehicle wheels. Operating the electric machine in this way may allow the electric machine to emulate wheel creep torque that is generated via an engine.

20 Claims, 7 Drawing Sheets

US 10,967,865 B2

METHODS AND SYSTEM FOR MANAGING WHEEL CREEP TORQUE OF A VEHICLE

FIELD

The present description relates to methods and a system for managing creep torque of a vehicle.

BACKGROUND AND SUMMARY

A vehicle may operate with a small wheel torque that may cause the vehicle to travel at a low speed (e.g., less than 10 kilometers/hour) when the vehicle is on a flat road and the vehicle's accelerator pedal and brake pedal are released. This small wheel torque may be referred to as wheel creep torque. The wheel creep torque may be useful to allow the vehicle to remain stationary when the vehicle is on an incline and when the vehicle's brake pedal is released. Further, the wheel creep torque may be useful to provide smooth low speed vehicle launches. A conventional driveline or powertrain that includes only a sole propulsion source, such as an internal combustion engine, may provide a consistent wheel creep torque via operating an engine at a fixed idle speed and with an open torque converter. However, operating the driveline with an open torque converter may reduce driveline efficiency. In addition, some hybrid drivelines may include an electric machine as well as the engine for propelling the vehicle and these hybrid drivelines may be operated with torque converter impeller speed that is less than engine idle speeds to improve driveline efficiency and improve low vehicle speed control. While it may be desirable to provide wheel creep torque solely via an electric machine to improve driveline efficiency and low vehicle speed control, it may not be possible to always provide wheel creep torque solely via an electric machine. Therefore, it may be desirable to provide a way of operating a vehicle that provides relatively consistent wheel creep torque whether the vehicle is operating with the engine or the electric machine as a propulsion source.

The inventors herein have recognized the above-mentioned issues and have developed a driveline operating method, comprising: via a controller, in a first driveline mode where a torque converter is locked, adjusting an electric machine torque request as a function of a wheel creep torque in a second driveline mode where the torque converter is unlocked and an engine is a sole propulsion source of a driveline providing torque to wheels of a vehicle; and adjusting torque of an electric machine responsive to the electric machine torque request.

By adjusting an electric machine torque in a driveline mode where a torque converter is locked as a function of a wheel creep torque in a second driveline mode where the torque converter is unlocked, it may be possible to provide the technical result of delivering a relatively smooth and consistent wheel creep torque even when driveline wheel torque creep modes are changed. For example, a wheel creep torque during a driveline mode when a torque converter is unlocked may be the basis for a wheel creep torque during a driveline mode when the torque converter is locked. In particular, a wheel creep torque that is generated via an engine operating at its idle speed may be a basis for operating a driveline when only an electric machine is providing propulsion power to the vehicle so that the wheel creep torque may be uniform whether the electric machine or the engine is providing propulsive power to the driveline.

The present description may provide several advantages. In particular, the approach may provide a uniform wheel creep torque in several different driveline operating modes. Further, the approach may allow smooth transitions between the several driveline wheel torque creep operating modes. In addition, the approach may be utilized in vehicles that include a torque converter and in vehicles that include two input clutches (e.g., duel clutch transmissions).

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

The present description is related to operating a driveline that includes an engine and an electric machine. The driveline may be operated in four different wheel torque creep modes. Further, the driveline may be transitioned between the four wheel torque creep modes while providing wheel creep torque. The driveline may include an engine of the type shown in FIG. 1. The engine may be included in a driveline as shown in FIG. 2. The vehicle driveline may be operated according to the method of FIG. 3 for selecting which wheel torque creep mode is activated. The driveline may switch between wheel torque creep modes according to the method of FIG. 4. The sequence of FIG. 5 shows a prophetic example of how the method of FIG. 4 controls a driveline. The driveline may also switch between wheel torque creep modes according to the method of FIG. 6. The sequence of FIG. 7 shows a prophetic example of how the method of FIG. 6 controls a driveline.

Figure 1:
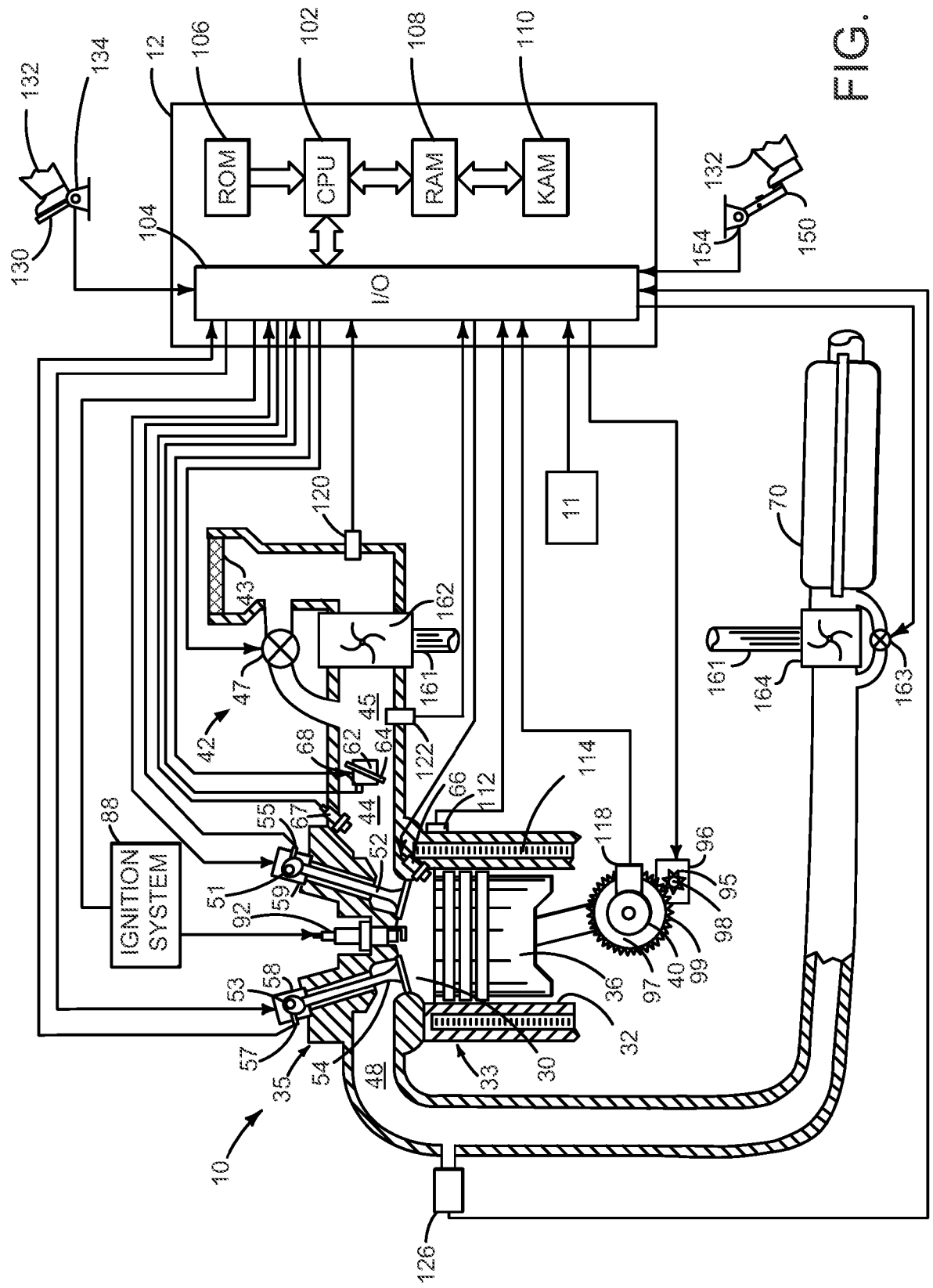
FIG. 1 is a schematic diagram of an engine.
Figure 2:
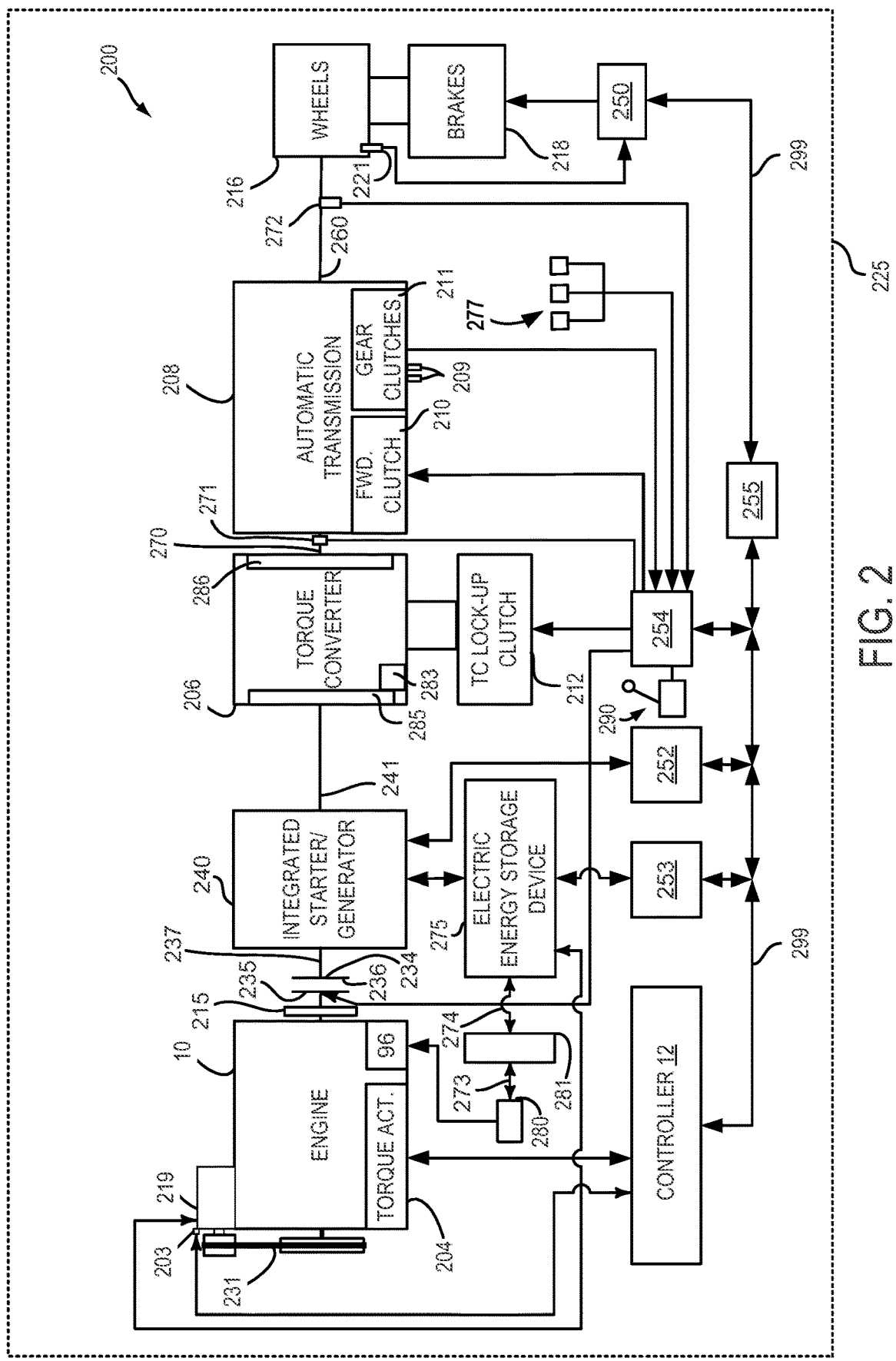
FIG. 2 is a schematic diagram of a vehicle driveline.

Referring to FIG. 1, internal combustion engine 10, comprising a plurality of cylinders, one cylinder of which is shown in FIG. 1, is controlled by electronic engine controller 12. The controller 12 receives signals from the various sensors shown in FIGS. 1-3. The controller employs the actuators shown in FIGS. 1-2 to adjust engine and driveline or powertrain operation based on the received signals and instructions stored in memory of controller 12.

Engine 10 is comprised of cylinder head 35 and block 33, which include combustion chamber 30 and cylinder walls 32. Piston 36 is positioned therein and reciprocates via a connection to crankshaft 40. Flywheel 97 and ring gear 99 are coupled to crankshaft 40. Optional starter 96 (e.g., low voltage (operated with less than 30 volts) electric machine) includes pinion shaft 98 and pinion gear 95. Pinion shaft 98 may selectively advance pinion gear 95 via solenoid 93 to engage ring gear 99. Optional starter 96 may be directly mounted to the front of the engine or the rear of the engine. In some examples, starter 96 may selectively supply power to crankshaft 40 via a belt or chain. In one example, starter 96 is in a base state when not engaged to the engine crankshaft 40 and flywheel ring gear 99.

Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58. Valve activation devices 58 and 59 may be electro-mechanical devices.

Direct fuel injector 66 is shown positioned to inject fuel directly into cylinder 30, which is known to those skilled in the art as direct injection. Port fuel injector 67 is shown positioned to inject fuel into the intake port of cylinder 30, which is known to those skilled in the art as port injection. Fuel injectors 66 and 67 deliver liquid fuel in proportion to pulse widths provided by controller 12. Fuel is delivered to fuel injectors 66 and 67 by a fuel system (not shown) including a fuel tank, fuel pump, and fuel rail (not shown).

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 adjusts a position of throttle plate 64 to control air flow from compressor 162 to intake manifold 44. Pressure in boost chamber 45 may be referred to a throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162. Air filter 43 cleans air entering engine air intake 42.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of three-way catalyst 70. Alternatively, a two-state exhaust gas oxygen sensor may be substituted for UEGO sensor 126.

Catalyst 70 may include multiple bricks and a three-way catalyst coating, in one example. In another example, multiple emission control devices, each with multiple bricks, can be used.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 (e.g., a human/machine interface) for sensing force applied by human driver 132; a position sensor 154 coupled to brake pedal 150 (e.g., a human/machine interface) for sensing force applied by human driver 132, a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

Controller 12 may also receive input from human/machine interface 11. A request to start or stop the engine or vehicle may be generated via a human and input to the human/machine interface 11. The human/machine interface 11 may be a touch screen display, pushbutton, key switch or other known device.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational power of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle 225 including a powertrain or driveline 200. The powertrain of FIG. 2 includes engine 10 shown in FIG. 1. Powertrain 200 is shown including vehicle system controller 255, engine controller 12, electric machine controller 252, transmission controller 254, energy storage device controller 253, and brake controller 250. The controllers may communicate over controller area network (CAN) 299. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 12, electric machine controller 252, transmission controller 254, and brake controller 250 to achieve driver input requests and other requests that are based on vehicle operating conditions.

For example, in response to a driver releasing an accelerator pedal and vehicle speed, vehicle system controller 255 may request a desired wheel power or a wheel power level to provide a desired rate of vehicle deceleration. The requested desired wheel power may be provided by vehicle system controller 255 requesting a first braking power from electric machine controller 252 and a second braking power from engine controller 12, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or accelerate driveline and wheel rotation.

In other examples, the partitioning of controlling powertrain devices may be partitioned differently than is shown in FIG. 2. For example, a single controller may take the place of vehicle system controller 255, engine controller 12, electric machine controller 252, transmission controller 254, and brake controller 250. Alternatively, the vehicle system controller 255 and the engine controller 12 may be a single unit while the electric machine controller 252, the transmission controller 254, and the brake controller 250 are stand-alone controllers.

In this example, powertrain 200 may be powered by engine 10 and electric machine 240. In other examples, engine 10 may be omitted. Engine 10 may be started with an engine starting system shown in FIG. 1, via BISG 219, or via driveline integrated starter/generator (ISG) 240 also known as an integrated starter/generator. A speed of BISG 219 may be determined via optional BISG speed sensor 203. Driveline ISG 240 (e.g., high voltage (operated with greater than 30 volts) electrical machine) may also be referred to as an electric machine, motor, and/or generator. Further, power of engine 10 may be adjusted via power actuator 204, such as a fuel injector, throttle, etc.

BISG is mechanically coupled to engine 10 via belt 231. BISG may be coupled to crankshaft 40 or a camshaft (e.g., 51 or 53 of FIG. 1). BISG may operate as a motor when supplied with electrical power via electric energy storage device 275 or low voltage battery 280. BISG may operate as a generator supplying electrical power to electric energy storage device 275 or low voltage battery 280. Bi-directional DC/DC converter 281 may transfer electrical energy from a high voltage buss 274 to a low voltage buss 273 or vice-versa. Low voltage battery 280 is electrically coupled to low voltage buss 273. Electric energy storage device 275 is electrically coupled to high voltage buss 274. Low voltage battery 280 selectively supplies electrical energy to starter motor 96.

An engine output power may be transmitted to an input or first side of powertrain disconnect clutch 235 through dual mass flywheel 215. Disconnect clutch 236 may be electrically or hydraulically actuated. The downstream or second side 234 of disconnect clutch 236 is shown mechanically coupled to ISG input shaft 237.

ISG 240 may be operated to provide power to powertrain 200 or to convert powertrain power into electrical energy to be stored in electric energy storage device 275 in a regeneration mode. ISG 240 is in electrical communication with energy storage device 275. ISG 240 has a higher output power capacity than starter 96 shown in FIG. 1 or BISG 219. Further, ISG 240 directly drives powertrain 200 or is directly driven by powertrain 200. There are no belts, gears, or chains to couple ISG 240 to powertrain 200. Rather, ISG 240 rotates at the same rate as powertrain 200. Electrical energy storage device 275 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive power or a negative power to powertrain 200 via operating as a motor or generator as instructed by electric machine controller 252.

Torque converter 206 includes a turbine 286 to output power to input shaft 270. Input shaft 270 mechanically couples torque converter 206 to automatic transmission 208. Torque converter 206 also includes a torque converter bypass lock-up clutch 212 (TCC). Power is directly transferred from impeller 285 to turbine 286 when TCC is locked. TCC is electrically operated by controller 254. Alternatively, TCC may be hydraulically locked. In one example, the torque converter may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling torque multiplication. In contrast, when torque converter lock-up clutch 212 is fully engaged, the engine output power is directly transferred via the torque converter clutch to an input shaft 270 of transmission 208. Alternatively, the torque converter lock-up clutch 212 may be partially engaged, thereby enabling the amount of power directly relayed to the transmission to be adjusted. The transmission controller 254 may be configured to adjust the amount of power transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches (e.g., gears 1-10) 211 and forward clutch 210. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

Further, a frictional force may be applied to wheels 216 by engaging friction wheel brakes 218. In one example, friction wheel brakes 218 may be engaged in response to a human driver pressing their foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure.

In response to a request to accelerate vehicle 225, vehicle system controller may obtain a driver demand power or power request from an accelerator pedal or other device. Vehicle system controller 255 then allocates a fraction of the requested driver demand power to the engine and the remaining fraction to the ISG or BISG. Vehicle system controller 255 requests the engine power from engine controller 12 and the ISG power from electric machine controller 252. If the ISG power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter clutch 212 and engages gears via gear clutches 211 in response to shift schedules and TCC lockup schedules that may be based on input shaft power and vehicle speed. In some conditions when it may be desired to charge electric energy storage device 275, a charging power (e.g., a negative ISG power) may be requested while a non-zero driver demand power is present. Vehicle system controller 255 may request increased engine power to overcome the charging power to meet the driver demand power.

In response to a request to decelerate vehicle 225 and provide regenerative braking, vehicle system controller may provide a negative desired wheel power (e.g., desired or requested powertrain wheel power) based on vehicle speed and brake pedal position. Vehicle system controller 255 then allocates a fraction of the negative desired wheel power to the ISG 240 and the engine 10. Vehicle system controller may also allocate a portion of the requested braking power to friction brakes 218 (e.g., desired friction brake wheel power). Further, vehicle system controller may notify transmission controller 254 that the vehicle is in regenerative braking mode so that transmission controller 254 shifts gears 211 based on a unique shifting schedule to increase regeneration efficiency. Engine 10 and ISG 240 may supply a negative power to transmission input shaft 270, but negative power provided by ISG 240 and engine 10 may be limited by transmission controller 254 which outputs a transmission input shaft negative power limit (e.g., not to be exceeded threshold value). Further, negative power of ISG 240 may be limited (e.g., constrained to less than a threshold negative threshold power) based on operating conditions of electric energy storage device 275, by vehicle system controller 255, or electric machine controller 252. Any portion of desired negative wheel power that may not be provided by ISG 240 because of transmission or ISG limits may be allocated to engine 10 and/or friction brakes 218 so that the desired wheel power is provided by a combination of negative power (e.g., power absorbed) via friction brakes 218, engine 10, and ISG 240.

Accordingly, power control of the various powertrain components may be supervised by vehicle system controller 255 with local power control for the engine 10, transmission 208, electric machine 240, and brakes 218 provided via engine controller 12, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder basis to control the engine power output.

Electric machine controller 252 may control power output and electrical energy production from ISG 240 by adjusting current flowing to and from field and/or armature windings of ISG as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft acceleration. Transmission controller 254, engine controller 12, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, and BISG temperatures, gear shift lever sensors, and ambient temperature sensors. Transmission controller 254 may also receive requested gear input from gear shift selector 290 (e.g., a human/machine interface device). Gear shift selector 290 may include positions for gears 1-N (where N is an upper gear number), D (drive), and P (park).

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative ISG power does not cause the wheel power limit to be exceeded. For example, if controller 250 issues a negative wheel power limit of 50 N-m, ISG power is adjusted to provide less than 50 N-m (e.g., 49 N-m) of negative power at the wheels, including accounting for transmission gearing.

Thus, the system of FIGS. 1 and 2 provides for a system, comprising: an engine in a hybrid vehicle driveline; an electric machine in the hybrid driveline; a torque converter directly coupled to the electric machine and a transmission; and a controller including executable instructions stored in non-transitory memory to adjust an electric machine torque as a function of a wheel creep torque in a first mode where the torque converter is locked, the wheel creep torque delivered in a second driveline mode where the torque converter is unlocked. The system further comprises additional instructions to change from the first mode to a third mode in response to a request to change driveline operating modes. The system includes where changing from the first mode to the third mode includes changing to the second mode. The system further comprises additional instructions to operate in the first mode with a torque converter impeller speed that is less than an engine idle speed. The system further comprises additional instructions to change from the first mode to a fourth mode where the engine is running and the electric machine is deactivated, and where the engine provides the wheel creep torque while the torque converter is locked.

Figure 3:
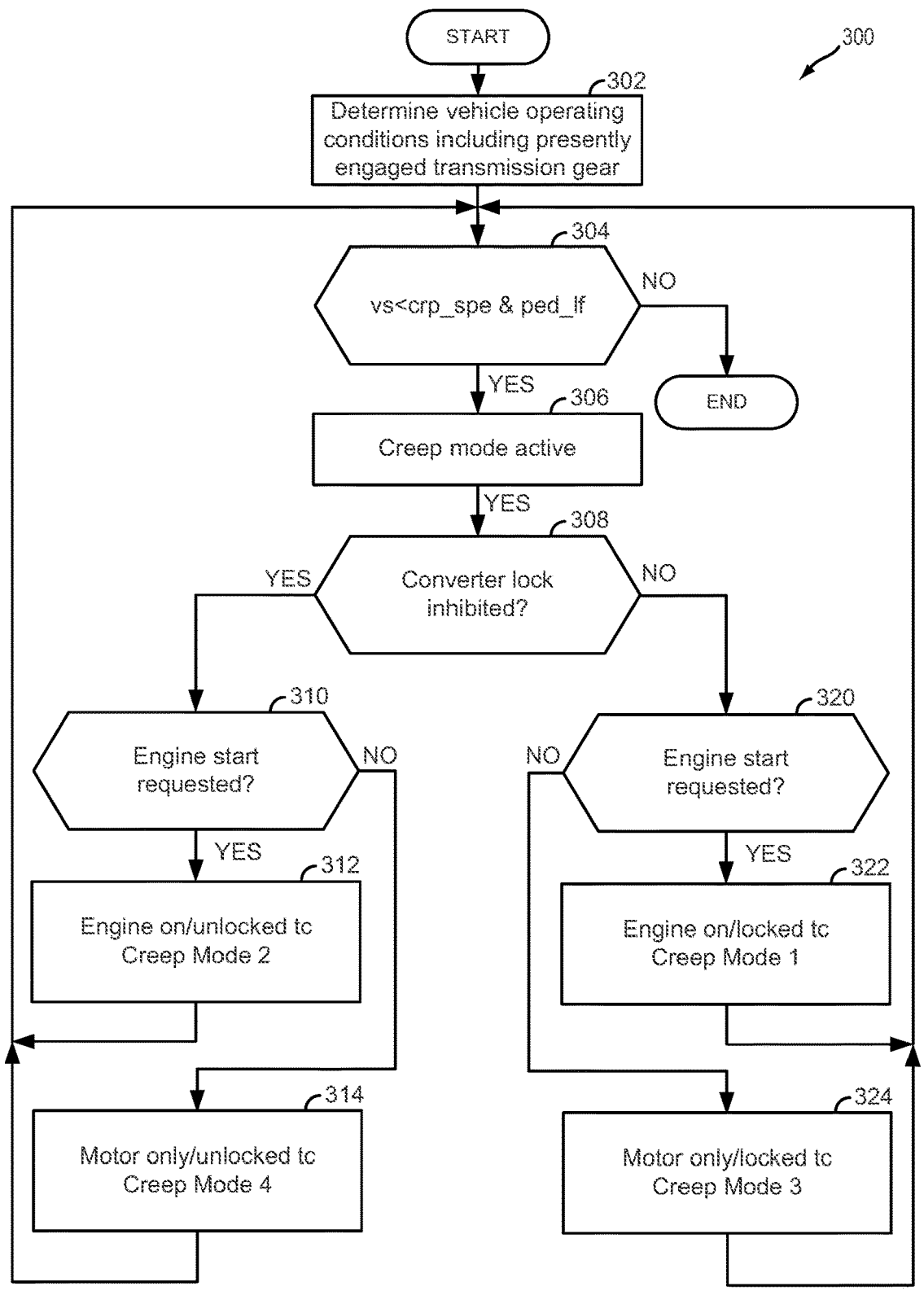
FIG. 3 shows a method for selecting vehicle wheel torque creep modes.

Referring now to FIG. 3, a flow chart of a method for selecting wheel torque creep modes of a hybrid vehicle is shown. The method of FIG. 3 may be incorporated into and may cooperate with the system of FIGS. 1-2 and the methods of FIGS. 4 and 6. Further, at least portions of the method of FIG. 3 may be incorporated as executable instructions stored in non-transitory memory while other portions of the method may be performed via a controller transforming operating states of devices and actuators in the physical world.

At 302, method 300 determines vehicle operating conditions. Vehicle operating conditions may include but are not limited to driver demand torque, vehicle speed, electric machine speed, engine speed, vehicle speed, engine temperature, electric energy storage device state of charge (SOC), and accelerator pedal position. Method 300 proceeds to 304.

At 304, method 300 judges if vehicle speed (vs) is less than a vehicle creep speed threshold (crp_spe) and if an accelerator pedal is not applied (ped_lf). In one example, the vehicle creep speed threshold is an offset speed (e.g., 4 kilometers/hour) plus a speed at which the vehicle moves at a constant speed when the vehicle's brake pedal is released, the vehicle's accelerator pedal is not applied, and the vehicle is traveling on a flat road. If method 300 judges that vehicle speed (vs) is less than a vehicle creep speed threshold (crp_spe) and if an accelerator pedal is not applied (ped_lf), the answer is yes and method 300 proceeds to 306. Otherwise, the answer is no and method 300 proceeds to exit. Method 300 may operate the driveline in a mode that is based on driver demand torque and vehicle speed if method 300 proceeds to exit.

At 306, method 300 activates creep mode and may supply a substantially constant wheel creep torque to vehicle wheels (e.g., a wheel creep torque that varies by less than +5 percent). Method 300 proceeds to 308.

At 308, method 300 judges if locking the torque converter clutch is inhibited. The torque converter clutch may be selectively locked so that the torque converter impeller and the torque converter turbine rotate at a substantially same speed (e.g., within 20 RPM of each other). Locking the torque converter clutch may be inhibited during some vehicle operating conditions. For example, locking of the torque converter clutch may be inhibited at engine speeds that are less than a threshold engine speed. If method 300 judges that locking of the torque converter is inhibited, the answer is yes and method 300 proceeds to 310. Otherwise, the answer is no and method 300 proceeds to 320.

At 310, method 300 judges if an engine start is requested. An engine start (e.g., rotating the engine and combusting fuel) may be requested in response to a low battery state of charge, a low engine temperature, or other vehicle operating conditions. If method 300 judges that an engine start is requested, the answer is yes and method 300 proceeds to 312. Otherwise, the answer is no and method 300 proceeds to 314.

At 314, method 300 activates the electric machine (e.g., a sole electric machine (240) that may provide propulsion power to the driveline). The electric machine may be activated via supplying electrical power to the electric machine. Method 300 also unlocks the torque converter clutch or keeps the torque converter unlocked, which allows a speed difference between the torque converter impeller speed and the torque converter turbine speed that is greater than a threshold speed. The driveline disconnect clutch is fully open and the engine may be operating (e.g., rotating and combusting fuel) or stopped (e.g., not rotating and combusting fuel). The electric machine is the sole source providing power to the vehicle wheels. This mode may be a fourth wheel torque creep mode. In the fourth wheel torque creep mode, the electric machine is the only activated driveline torque source supplying power to the wheels. Method 300 returns to 304 after the driveline is operating in the fourth wheel torque creep mode.

At 312, method 300 starts the engine and the torque converter is unlocked. The electric machine may or may not be activated. The engine is started via rotating the engine and supplying fuel to the engine so that combustion begins in the engine. This mode may be a second wheel torque creep mode. In the second wheel torque creep mode, the engine supplies power to the driveline and vehicle wheels to generate the wheel creep torque. The electric machine may or may not be activated. Method 300 returns to 304 after the driveline is operating in the second wheel torque creep mode.

At 320, method 300 judges if an engine start is requested. An engine start (e.g., rotating the engine and combusting fuel) may be requested in response to a low battery state of charge, a low engine temperature, or other vehicle operating conditions. If method 300 judges that an engine start is requested, the answer is yes and method 300 proceeds to 322. Otherwise, the answer is no and method 300 proceeds to 324.

At 324, method 300 activates the electric machine (e.g., a sole electric machine (240) that may provide propulsion power to the vehicle's wheels). The electric machine may be activated via supplying electrical power to the electric machine. The engine may be operating or stopped. Method 300 also locks the torque converter clutch, which allows less than a threshold speed difference between the torque converter impeller speed and the torque converter turbine speed. Locking the torque converter clutch may increase driveline efficiency. This mode may be a third wheel torque creep mode. In the third wheel torque creep mode, the electric machine is the only activated driveline torque source supplying power to the vehicle wheels. The driveline disconnect clutch is fully open. The power that is supplied by the electric machine provides a wheel creep torque. Method 300 returns to 304 after the driveline is operating in the third wheel torque creep mode.

At 322, method 300 starts the engine and the torque converter is locked. The electric machine may or may not be activated. The engine is started via rotating the engine and supplying fuel to the engine so that combustion begins in the engine. This mode may be a first wheel torque creep mode. In the first wheel torque creep mode, the engine supplies power to the driveline and vehicle wheels to generate the wheel creep torque. The electric machine may or may not be activated. Method 300 returns to 304 after the driveline is operating in the second wheel torque creep mode.

In this way, one of a plurality of wheel torque creep modes may be activated. Further, when one wheel torque creep mode is activated, other wheel torque creep modes are no longer activated. Each wheel torque creep mode may allow wheel creep while fulfilling other driveline requirements. For example, wheel torque creep modes two and one may be activated at different times when the engine is supplying creep torque and torque to charge a battery. Wheel torque creep modes three and four may be activated at different times to conserve power or fuel.

Figure 4:
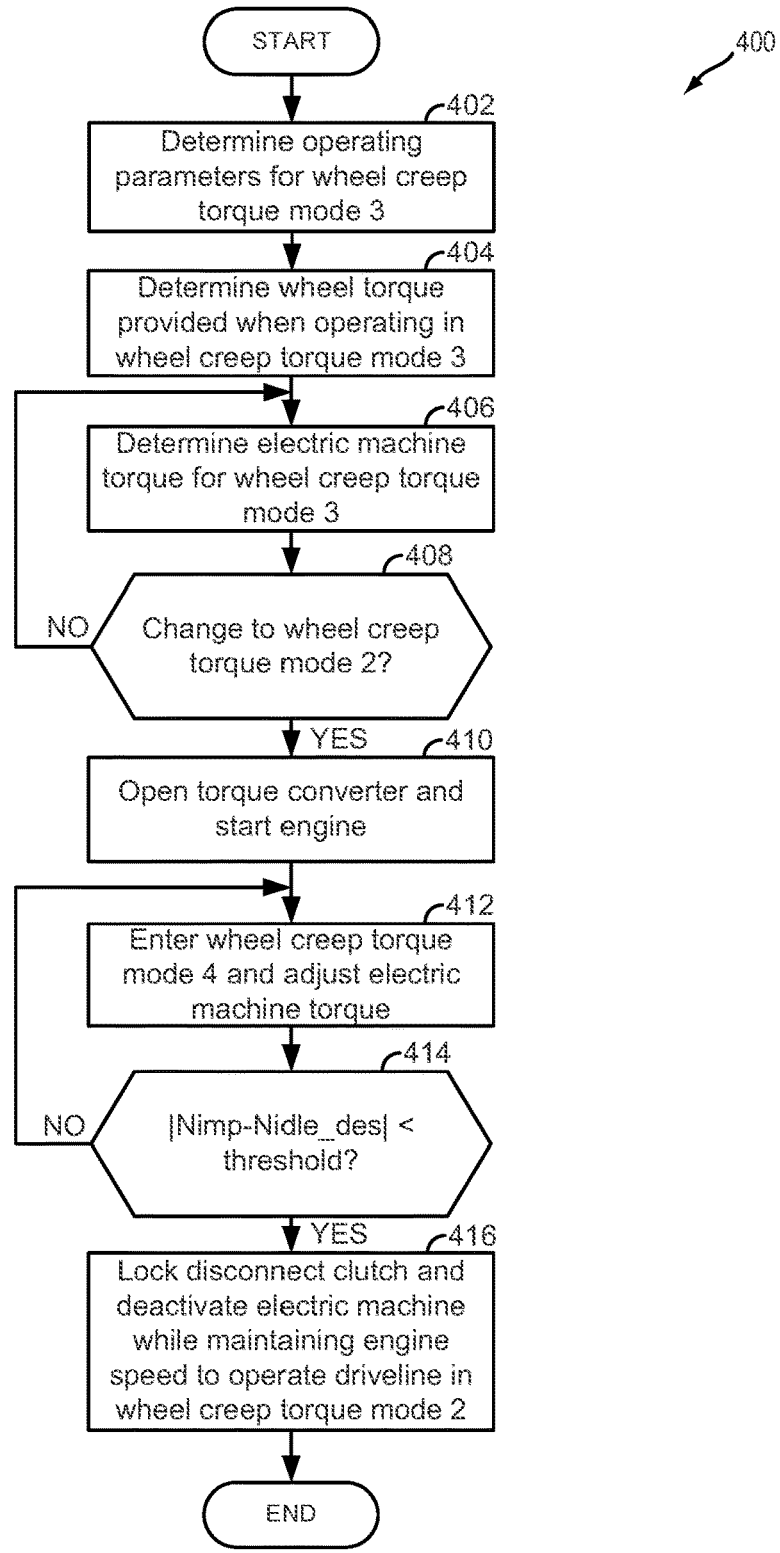
FIG. 4 shows a first method for transitioning between selected vehicle wheel torque creep modes.
Figure 5:
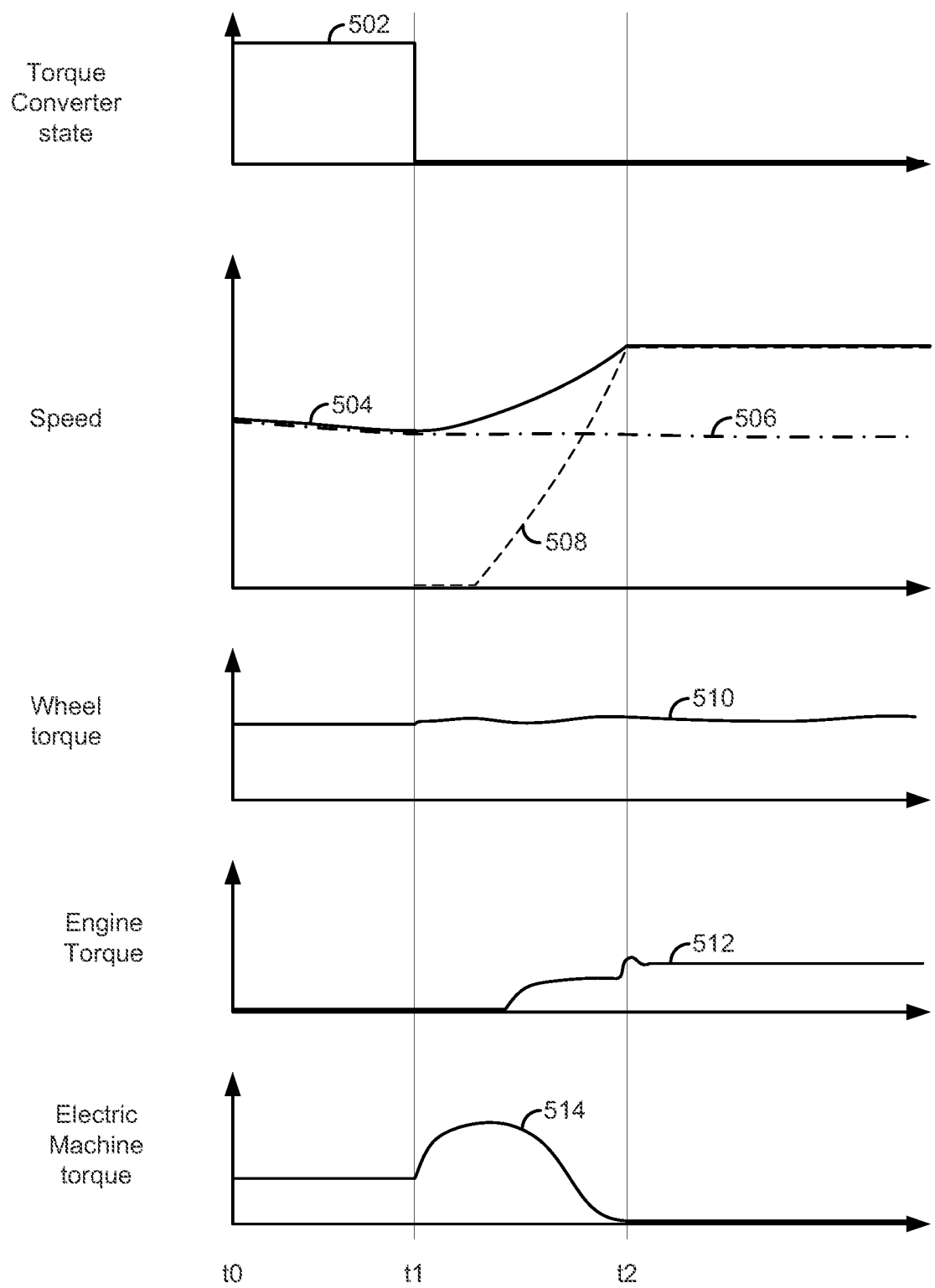
FIG. 5 shows a sequence where a driveline is transitioned between two wheel torque creep modes according to the method of FIG. 4.

Referring now to FIG. 4, a flow chart of a method for changing from one wheel torque creep mode to a second wheel torque creep mode is shown. The method of FIG. 4 may be incorporated into and may cooperate with the system of FIGS. 1-2 and the methods of FIGS. 3 and 6. Further, at least portions of the method of FIG. 4 may be incorporated as executable instructions stored in non-transitory memory while other portions of the method may be performed via a controller transforming operating states of devices and actuators in the physical world.

Method 400 describes changing from the third wheel torque creep mode (e.g., electric machine only providing propulsive force to the driveline and wheels with the torque converter locked) to the second wheel torque creep mode by way of passing through the fourth wheel torque creep mode.

At 402, method 400 determines operating parameters for operating the driveline in wheel torque creep mode number three. The operating parameters include an engine idle speed, a requested vehicle creep speed, a turbine speed for achieving the requested vehicle creep speed when the torque converter clutch is open and the vehicle is traveling on a flat road, and the present torque converter impeller speed.

In one example, method 400 retrieves a requested engine idle speed from controller memory (e.g., ROM). Method 400 also references a table or function that describes operation of a torque converter with an open torque converter clutch (e.g., a torque converter transfer function) to determine a torque converter turbine speed when the torque converter impeller speed is equal to the engine idle speed. The torque converter impeller speed is equal to the engine speed when the driveline disconnect clutch is fully closed. The table or function may be referenced via the requested engine idle speed. The present torque converter impeller speed may be determined via electric machine speed since the electric machine is directly coupled to the torque converter impeller. Method 400 proceeds to 404.

At 404, method 400 determines a wheel creep torque (e.g., creep torque that may be provided at the vehicle wheel) when the torque converter is unlocked, the torque converter impeller speed is equal to engine idle speed (Nidle_des), and torque converter turbine speed (Nt_creep) corresponding to the requested vehicle creep speed. In one example, the wheelcreep torque may be determined via empirically determined values that are stored in a function or table that is stored in controller memory. The wheel creep torque may be expressed as Tq_whlCreep=f(Nidle_des, Nt_creep), where f is a function that returns the requested wheel creep torque according to arguments Nidle_des and Nt_creep, Tq_whlCreep is the requested wheel creep torque. Method 400 proceeds to 406.

At 406, method 400 determines the electric machine torque for operating the driveline in the third wheel torque creep mode. In one example, the electric machine torque may be determined via the following equation: Tq_mtrReq=Tq_whlCreep/(rt_fd*rt_gb), where Tq_mtrReq is the requested electric machine torque (e.g., torque requested of electric machine 240), rt_fd is the gear ratio of the final drive, and rt_gb is the ratio of the gearbox. Method 400 requests the torque from the electric machine for operating the driveline in the third wheel torque creep mode. In addition, the torque converter clutch is locked, the engine is off (e.g., not rotating and not combusting fuel), and the driveline disconnect clutch is fully opened for the driveline to operate in the third wheel torque creep mode. Method 400 proceeds to 408.

At 408, method judges if there is a request to operate the driveline in the second wheel torque creep mode. The second wheel torque creep mode may be requested in response to a low battery state of charge, low engine temperature, low catalyst temperature, or other vehicle operating condition. If method 400 judges that there is a request to operate the driveline in the second wheel torque creep mode, the answer is yes and method 400 proceeds to 410. Otherwise, the answer is no and method 400 returns to 406.

Alternatively, method 400 may judge if an engine start is requested. If method 400 judges that there is an engine start request, the answer is yes and method 400 proceeds to 408. Otherwise, the answer is no and method 400 returns to 406.

At 410, method 400 unlocks the torque converter clutch and starts the engine. The driveline disconnect clutch is fully open so that the engine may rotate at a different speed than the electric machine. The engine may be cranked for starting when the torque converter impeller speed is greater than a first threshold speed. The engine may begin receiving fuel when engine speed is greater than a second threshold speed. Method 400 proceeds to 412.

At 412, method 400 operates the driveline in the fourth wheel torque creep mode since the electric machine is the sole propulsion source providing torque to the vehicle's wheels and since the torque converter clutch is unlocked. In the fourth wheel torque creep mode, the requested torque converter impeller speed is a function of the torque converter impeller speed when the driveline was operating in the third wheel torque creep mode and at the desired engine idle speed, which may be expressed as: Nimp_des=f(Nimp_M3, Nidle_des) where Nimp_des is the desired or requested torque converter impeller speed when the driveline is operating in the fourth wheel torque creep mode and Nimp_M3 is the torque converter impeller speed when the driveline exited the third wheel torque creep mode. Method 400 also makes the desired vehicle acceleration zero and requests electric machine torque according to the following equation:

Tq_mtrReq=Tq_whlReq/(rt_fd*rt_gb*rt_conv)

where Tq_whlReq=Tq_rl+rt_fd*rt_gb*rt_conv*Jmtr*d(Nimp_des)/dt, where Tq_rl is the vehicle road load torque, rt_conv is the ratio of the torque converter, Jmtr is the lumped electric machine and impeller inertia, and the remaining variables are as previously described. Method 400 proceeds to 414.

At 414, method 400 judges if the absolute value of the present torque converter impeller speed minus the desired engine idle speed is less than a threshold value. If so, the answer is yes and method 400 proceeds to 416. Otherwise, the answer is no and method 400 returns to 412.

At 416, method 400 locks the driveline disconnect clutch to couple the engine to the electric machine and the torque converter impeller. Method 400 also deactivates the electric machine so that the electric machine does not operate as a motor; however, the electric machine may be operated as a generator. Method 400 also operates the engine in a speed control mode where engine speed is adjusted to a requested engine speed (e.g., engine idle speed) and engine torque is adjusted to maintain the engine at the engine idle speed. Operating the engine at the engine idle speed provides a requested amount of wheel creep torque. Method 400 proceeds to exit.

In this way, a driveline may change from operating in a third wheel torque creep mode to operating in a fourth wheel torque creep mode in response to a request to operate the driveline in a second wheel torque creep mode before the driveline enters the second wheel torque creep mode. Further, the electric machine torque in the third wheel torque creep mode may be adjusted to a torque that is based on an engine idle speed in the second wheel torque creep mode.

Referring now to FIG. 5, plots of a prophetic vehicle operating sequence according to the method of FIG. 4 and the systems of FIGS. 1 and 2 are shown. The plots are aligned in time and occur at a same time. The vertical lines at t0-t2 show particular times of interest.

The first plot from the top of FIG. 5 is a plot of a torque converter clutch state versus time and the torque converter clutch is locked when trace 502 is at a higher level near the vertical axis arrow. The torque converter clutch is not locked when trace 502 is at a lower level near the horizontal axis. The horizontal axis represents time and the time increases from the left side of the figure to the right side of the figure. Trace 502 represents the torque converter clutch operating state.

The second plot from the top of FIG. 5 is a plot of speed versus time. The vertical axis represents speed and speed increases in the direction of the vertical axis arrow. The horizontal axis represents time and the time increases from the left side of the figure to the right side of the figure. Trace 504 represents the torque converter impeller speed. Trace 506 represents the torque converter turbine speed. Trace 508 represents the engine speed.

The third plot from the top of FIG. 5 is a plot of wheel torque versus time. The vertical axis represents the wheel torque and the wheel torque increases in the direction of the vertical axis arrow. The horizontal axis represents time and the time increases from the left side of the figure to the right side of the figure. Trace 510 represents the wheel torque.

The fourth plot from the top of FIG. 5 is a plot of engine torque versus time. The vertical axis represents the engine torque and the engine torque increases in the direction of the vertical axis arrow. The horizontal axis represents time and the time increases from the left side of the figure to the right side of the figure. Trace 512 represents the engine torque.

The fifth plot from the top of FIG. 5 is a plot of electric machine torque versus time. The vertical axis represents the electric machine torque and the electric machine torque increases in the direction of the vertical axis arrow. The horizontal axis represents time and the time increases from the left side of the figure to the right side of the figure. Trace 514 represents the electric machine torque.

At time t0, the driveline is operating in the third wheel torque creep mode and the torque converter clutch is locked. The torque converter impeller speed and the torque converter turbine speed are at a middle level and engine speed is zero. The wheel torque is at a middle level and engine torque is zero since the engine is stopped. The electric machine torque is at a middle level.

At time t1, a request is made to switch from the third wheel torque creep mode to the second wheel torque creep mode. The torque convert clutch is unlocked in response to the request and the electric machine torque is increased. By opening the torque converter clutch, the driveline is changed from operating in the third wheel torque creep mode to operating in the fourth wheel torque creep mode.

Between time t1 and time t2, the electric machine torque continues to increase and then it decreases before time t2. The torque converter impeller speed increases toward a requested engine idle speed (not shown) and the torque converter turbine speed is held constant. The engine is cranked and it accelerates up toward the torque converter impeller speed. The engine may be operated in a speed control mode while it is accelerating. The wheel torque is maintained at a substantially constant value and the engine torque is increased to accelerate the engine up to the torque converter impeller speed. The driveline disconnect clutch is open (not shown).

At time t2, the driveline disconnect clutch is fully closed in response to the engine speed being equal to the torque converter impeller speed. The torque converter impeller speed is greater than the torque converter turbine speed. The wheel torque continues on at or near its previous level. The engine torque is adjusted to maintain the engine speed at the engine idle speed. The electric machine is deactivated.

In this way, the driveline may switch from operating in a third wheel torque creep mode to operating in a second wheel torque creep mode. This procedure or method may reduce the possibility of driveline torque disturbances and allow the driveline to operate efficiently.

Figure 6:
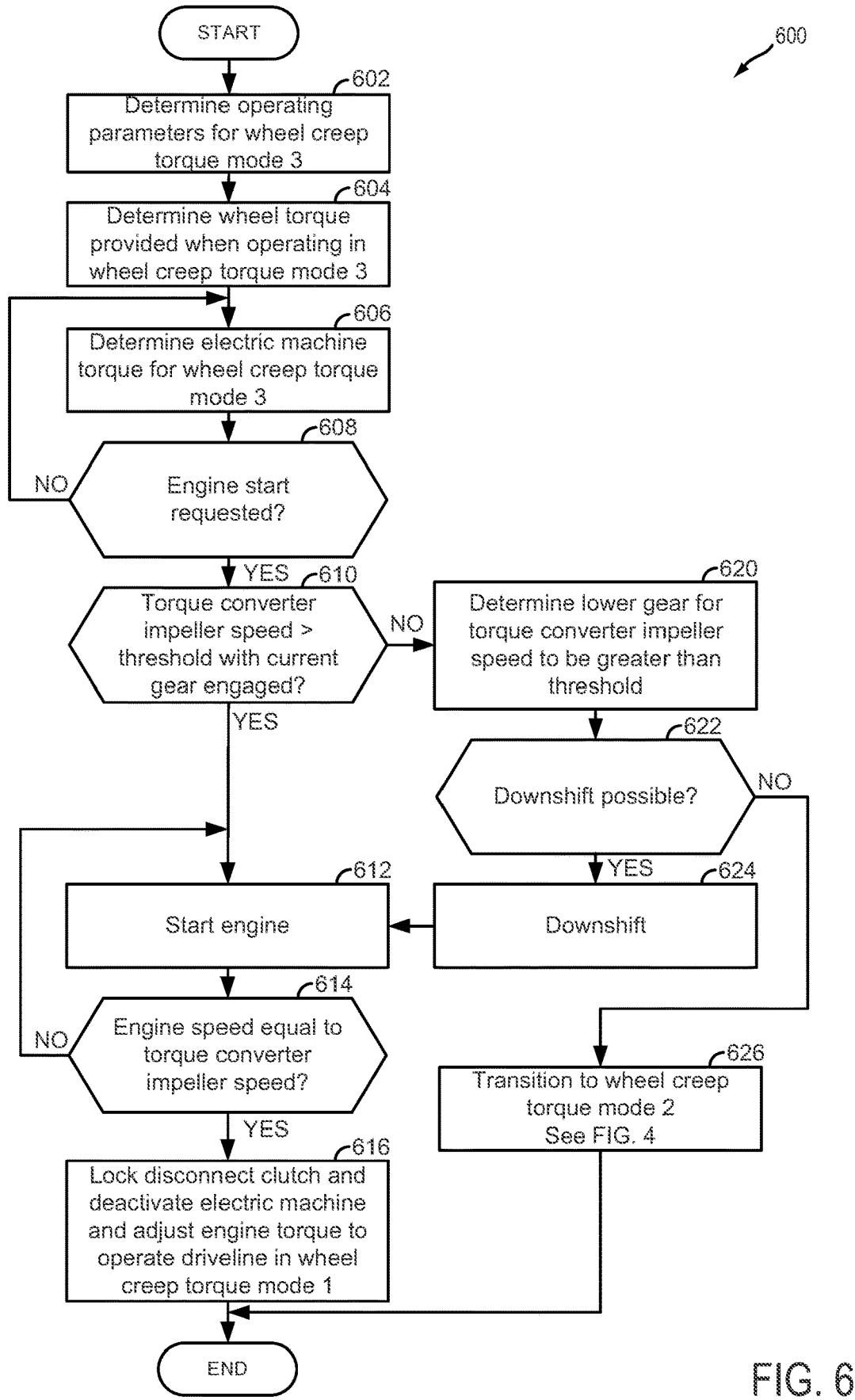
FIG. 6 shows a second method for transitioning between selected vehicle wheel torque creep modes.
Figure 7:
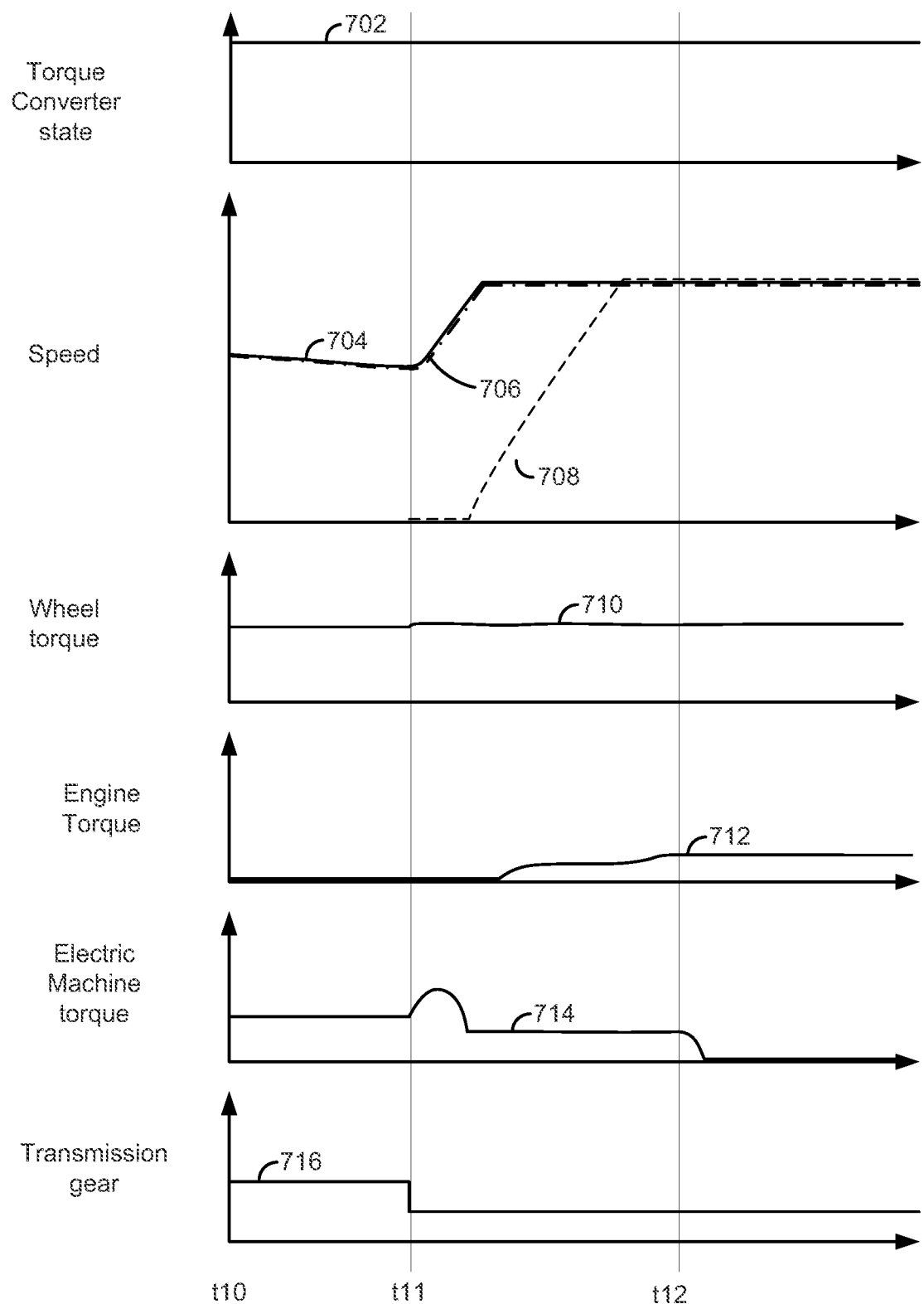
FIG. 7 shows a sequence where a driveline is transitioned between two wheel torque creep modes according to the method of FIG. 6.

Referring now to FIG. 6, a flow chart of a method for changing from one wheel torque creep mode to a second wheel torque creep mode is shown. The method of FIG. 6 may be incorporated into and may cooperate with the system of FIGS. 1-2 and the methods of FIGS. 3 and 4. Further, at least portions of the method of FIG. 6 may be incorporated as executable instructions stored in non-transitory memory while other portions of the method may be performed via a controller transforming operating states of devices and actuators in the physical world.

Method 600 describes changing from the third wheel torque creep mode where the electric machine is the only propulsion source providing propulsive force to the vehicle's wheels with the torque converter locked to the first wheel torque creep mode where the engine is providing torque to the vehicle's wheels with the torque converter locked.

At 602, method 600 determines operating parameters for operating the driveline in wheel torque creep mode number three. The operating parameters include an engine idle speed, a requested vehicle creep speed, a turbine speed for achieving the requested vehicle creep speed when the torque converter clutch is open and the vehicle is traveling on a flat road, and the present torque converter impeller speed.

In one example, method 600 retrieves a requested engine idle speed from controller memory (e.g., ROM). Method 600 also references a table or function that describes operation of a torque converter with an open torque converter clutch (e.g., a torque converter transfer function) to determine a torque converter turbine speed and a torque converter turbine speed when the torque converter impeller speed is equal to the engine idle speed. The torque converter impeller speed is equal to the engine speed when the driveline disconnect clutch is fully closed. The table or function may be referenced via the requested engine idle speed. The present torque converter impeller speed may be determined via electric machine speed since the electric machine is directly coupled to the torque converter impeller. Method 600 proceeds to 604.

At 604, method 600 determines a wheel creep torque (e.g., creep torque that may be provided at the vehicle wheel) when the torque converter is unlocked, the torque converter impeller speed is equal to engine idle speed (Nidle_des), and torque converter turbine speed (Nt_creep) corresponding to the requested vehicle creep speed. In one example, the wheel creep torque may be determined via empirically determined values that are stored in a function or table that is stored in controller memory. The wheel creep torque may be expressed as Tq_whlCreep=f(Nidle_des, Nt_creep), where Tq_whlCreep is the requested wheel creep torque. Method 600 proceeds to 606.

At 606, method 600 determines the electric machine torque for operating the driveline in the third wheel torque creep mode. In one example, the electric machine torque may be determined via the following equation: Tq_mtrReq=Tq_whlCreep/(rt_fd*rt_gb), where Tq_mtrReq is the requested electric machine torque (e.g., torque requested of electric machine 240), rt_fd is the gear ratio of the final drive, and rt_gb is the ratio of the gearbox. Method 600 requests the torque from the electric machine for operating the driveline in the third wheel torque creep mode. In addition, the torque converter clutch is locked, the engine is off (e.g., not rotating and not combusting fuel), and the driveline disconnect clutch is fully opened for the driveline to operate in the third wheel torque creep mode. Method 600 proceeds to 608.

At 608, method judges if there is a request to operate the driveline in the first wheel torque creep mode. The first wheel torque creep mode may be requested in response to a low battery state of charge, low engine temperature, low catalyst temperature, or other vehicle operating condition. Further, the first wheel torque creep mode may be requested when increased driveline efficiency is requested. If method 600 judges that there is a request to operate the driveline in the first wheel torque creep mode, the answer is yes and method 600 proceeds to 610. Otherwise, the answer is no and method 600 returns to 606.

Alternatively, method 600 may judge if an engine start is requested. If method 600 judges that there is an engine start request, the answer is yes and method 600 proceeds to 610. Otherwise, the answer is no and method 600 returns to 606.

At 610, method 600 judges if the present torque converter impeller speed is greater than a threshold speed (e.g., an minimum steady speed at which the engine may rotate and combust fuel and where the possibility of engine stalling is low) with the assumption of no transmission gear change (with no transmission gear change during the wheel torque creep mode change). If so, the answer is yes and method 600 proceeds to 612. Otherwise, the answer is no and method 600 proceeds to 620.

At 612, method 600 cranks the engine via rotating the engine via a starter motor. Method 600 begins supplying fuel to the engine when engine speed exceeds a threshold. Method 600 continues to operate the driveline in the third wheel torque creep mode. Method 600 accelerates the engine to the torque converter impeller speed (e.g., the requested engine idle speed) while operating the engine in a speed control mode. Method 600 proceeds to 614.

At 614, method 600 judges if engine speed is equal to torque converter impeller speed. If so, the answer is yes and method 600 proceeds to 616. Otherwise, the answer is no and method 600 returns to 612.

At 616, method 600 locks the driveline disconnect clutch to couple the engine to the electric machine and the torque converter impeller. Method 600 also deactivates the electric machine so that the electric machine does not operate as a motor; however, the electric machine may be operated as a generator. Method 600 also operates the engine in a torque control mode and engine torque is adjusted according to the following equation: Tq_EngReq=Tq_whlCreep/(rt_fd*rt_gb), where Tq_EngReq is the requested engine torque. The engine is commanded to the requested engine torque via adjusting an engine torque actuator. The driveline is now operating in the first wheel torque creep mode. Method 600 proceeds to exit.

At 620, method 600 determines a lower gear with which the torque converter impeller speed will be increased to a speed that is greater than the threshold engine speed (e.g., the minimum engine operating speed). In one example, method 600 determines the lower gear via dividing the present wheel speed by the final drive ratio multiplied by the next available gear to estimate the torque converter impeller speed when the next available lower gear is engaged. If the estimated torque converter impeller speed is greater than the minimum engine speed, a new estimate of torque converter impeller speed is made by selecting an even lower gear until either the estimated torque converter impeller speed is less than the minimum engine speed or first gear is the lowest gear for which the estimated torque converter impeller speed is determined. For example, of the minimum engine speed is 600 RPM and the estimated engine speed with the transmission engaged in the present gear ($4^{th}$ gear) is 400 RPM, then torque converter impeller speed for $3^{rd}$ gear is selected to determine torque converter impeller speed. If the estimated torque converter impeller speed is still below 600 RPM, then $2^{nd}$ gear is selected to determine torque converter impeller speed. If the estimated torque converter impeller speed for when $2^{nd}$ gear is still less than 600 RPM, then torque converter impeller speed is estimated for when the transmission is engaged in first gear at the present vehicle speed. Method 600 selects the highest transmission gear that allows the torque converter impeller speed at the present vehicle speed to be greater than the minimum engine speed. Method 600 proceeds to 622.

At 622, method 600 judges whether or not a downshift is possible. Method 600 may judge that a downshift is possible if the transmission is presently not engaged in first gear. If method 600 judges that a downshift is possible and the downshift will increase the torque converter impeller speed to a speed that is greater than a minimum engine speed, the answer is yes and method 600 proceeds to 624. Otherwise, the answer is no and method 600 proceeds to 626.

At 624, method 600 downshifts to the highest transmission gear that allows the torque converter impeller speed to be a speed that is greater than a minimum engine speed. For example, if downshifting into $1^{st}$ or $2^{nd}$ gear allows the torque converter impeller speed to be a speed that is greater than a minimum engine speed, then method 600 downshifts into 2nd gear. Method 600 proceeds to 612.

At 626, method 600 transitions into the second wheel torque creep mode according to the method of FIG. 4. Method 600 exits.

In this way, a driveline may change from operating in a third wheel torque creep mode to operating in a first wheel torque creep mode in response to a request to operate the driveline in the first wheel torque creep mode. The electric machine torque in the third wheel torque creep mode may be adjusted to a torque that is based on an engine idle speed in a second wheel torque creep mode.

Thus, the methods of FIGS. 4 and 6 provide for a driveline operating method, comprising: via a controller, in a first driveline mode where a torque converter is locked, adjusting an electric machine torque request as a function of a wheel creep torque in a second driveline mode where the torque converter is unlocked and an engine is a sole propulsion source of a driveline providing torque to wheels of a vehicle; and adjusting torque of an electric machine responsive to the electric machine torque request. The method further comprises operating the driveline with a driveline disconnect clutch open and an engine stopped in the first driveline mode. The method includes where the first driveline mode includes operating the driveline with the electric machine being the sole operating propulsion source. The method further comprises operating the driveline in a third mode in response to a request to change an active driveline mode from the first driveline mode to the second driveline mode. The method includes where the third mode includes operating with the torque converter unlocked and with the electric machine being the sole propulsion source providing torque to wheels of the vehicle and to increase torque converter impeller speed to engine idle speed, with no change in creep speed. The method further comprises changing from operating in the third mode to operating in the second mode in further response to an actual torque converter impeller speed minus a desired engine idle speed being less than a threshold. The method further comprises starting the engine in response to the request to change the active driveline mode from the first driveline mode to the second driveline mode. The method further comprises closing the driveline disconnect clutch in response to the actual torque converter impeller speed minus the desired engine idle speed being less than the threshold.

The method of FIGS. 4 and 6 also provides for a driveline operating method, comprising: via a controller, in a first driveline mode where a torque converter is locked, adjusting an electric machine torque request as a function of a wheel creep torque in a second driveline mode where the torque converter is unlocked and an engine is a sole propulsion source of a driveline providing torque to wheels of a vehicle; adjusting torque of an electric machine responsive to the electric machine torque request when the driveline is requested to operate in the first driveline mode; and starting an engine and coupling the engine to the electric machine while the torque converter is locked in response to a request to operate the driveline in a third driveline mode. The method includes where coupling of the engine to the electric machine is performed when a speed of the engine is equal to a speed of a torque converter impeller. The method further comprises deactivating the electric machine in response to coupling the engine to the electric machine. The method includes where the engine is coupled to the electric machine via a disconnect clutch. The method further comprises adjusting engine torque as a function of the wheel creep torque in the second driveline mode while operating the engine in the third driveline mode. The method further comprises downshifting a gear of a transmission in response to starting the engine and a torque converter impeller speed being less than an engine idle speed. The method further comprises not downshifting the transmission and changing to the second driveline mode when the transmission may not be downshifted.

Referring now to FIG. 7, plots of a prophetic vehicle operating sequence according to the method of FIG. 6 and the systems of FIGS. 1 and 2 are shown. The plots are aligned in time and occur at a same time. The vertical lines at t10-t12 show particular times of interest.

The first plot from the top of FIG. 7 is a plot of a torque converter clutch state versus time and the torque converter clutch is locked when trace 702 is at a higher level near the vertical axis arrow. The torque converter clutch is not locked when trace 702 is at a lower level near the horizontal axis. The horizontal axis represents time and the time increases from the left side of the figure to the right side of the figure. Trace 702 represents the torque converter clutch operating state.

The second plot from the top of FIG. 7 is a plot of speed versus time. The vertical axis represents speed and speed increases in the direction of the vertical axis arrow. The horizontal axis represents time and the time increases from the left side of the figure to the right side of the figure. Trace 704 represents the torque converter impeller speed. Trace 706 represents the torque converter turbine speed. Trace 708 represents the engine speed.

The third plot from the top of FIG. 7 is a plot of wheel torque versus time. The vertical axis represents the wheel torque and the wheel torque increases in the direction of the vertical axis arrow. The horizontal axis represents time and the time increases from the left side of the figure to the right side of the figure. Trace 710 represents the wheel torque.

The fourth plot from the top of FIG. 7 is a plot of engine torque versus time. The vertical axis represents the engine torque and the engine torque increases in the direction of the vertical axis arrow. The horizontal axis represents time and the time increases from the left side of the figure to the right side of the figure. Trace 712 represents the engine torque.

The fifth plot from the top of FIG. 7 is a plot of electric machine torque versus time. The vertical axis represents the electric machine torque and the electric machine torque increases in the direction of the vertical axis arrow. The horizontal axis represents time and the time increases from the left side of the figure to the right side of the figure. Trace 714 represents the electric machine torque.

The sixth plot from the top of FIG. 7 is a plot engaged transmission gear versus time. The vertical axis represents the engaged transmission gear and the engaged transmission gear number increases in the direction of the vertical axis arrow. The horizontal axis represents time and the time increases from the left side of the figure to the right side of the figure. Trace 716 represents the engaged transmission gear.

At time t10, the driveline is operating in the third wheel torque creep mode and the torque converter clutch is locked. The torque converter impeller speed and the torque converter turbine speed are at a middle level and engine speed is zero. The wheel torque is at a middle level and engine torque is zero since the engine is stopped. The electric machine torque is at a middle level.

At time t11, a request is made to switch from the third wheel torque creep mode to the first wheel torque creep mode. The transmission is downshifted and the torque convert clutch remains locked in response to the request and the electric machine torque is increased. By downshifting the transmission, the torque converter impeller speed is increased to a speed that is greater than a minimum engine speed. The wheel torque remains substantially constant and the engine is deactivated.

Between time t11 and time t12, the electric machine torque continues to increase and then it decreases before time t12. The torque converter impeller speed increases toward a requested engine idle speed (not shown) and the torque converter turbine speed increases with the torque converter impeller speed since the torque converter is locked. The engine is cranked and it accelerates up toward the torque converter impeller speed. The engine may be operated in a speed control mode while it is accelerating. The engine torque is increased to increase the engine speed. The driveline disconnect clutch is open (not shown).

At time t12, the driveline disconnect clutch is fully closed in response to the engine speed being equal to the torque converter impeller speed. The torque converter impeller speed is greater than the torque converter turbine speed. The wheel torque continues on at or near its previous level. The engine is operated in a torque control mode and the electric machine is deactivated.

In this way, the driveline may switch from operating in a third wheel torque creep mode to operating in a first wheel torque creep mode. This procedure or method may reduce the possibility of driveline torque disturbances and allow the driveline to operate efficiently.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, at least a portion of the described actions, operations and/or functions may graphically represent code to be programmed into non-transitory memory of the computer readable storage medium in the control system. The control actions may also transform the operating state of one or more sensors or actuators in the physical world when the described actions are carried out by executing the instructions in a system including the various engine hardware components in combination with one or more controllers.

This concludes the description. The reading of it by those skilled in the art would bring to mind many alterations and modifications without departing from the spirit and the scope of the description. For example, single cylinder, I3, I4, I5, V6, V8, V10, and V12 engines operating in natural gas, gasoline, diesel, or alternative fuel configurations could use the present description to advantage.

The invention claimed is:

1. A driveline operating method, comprising:
via a controller, in a first driveline mode where a torque converter is locked, adjusting an electric machine torque request as a function of a wheel creep torque in a second driveline mode, the second driveline mode being a mode where the torque converter is unlocked and an engine is a sole propulsion source of a driveline providing torque to wheels of a vehicle; and
adjusting torque of an electric machine responsive to the electric machine torque request.

2. The method of claim 1, further comprising operating the driveline with a driveline disconnect clutch open and an engine stopped in the first driveline mode.

3. The method of claim 2, where the first driveline mode includes operating the driveline with the electric machine being the sole operating propulsion source of the driveling providing torque to wheels of the vehicle.

4. The method of claim 3, further comprising operating the driveline in a third mode in response to a request to change an active driveline mode from the first driveline mode to the second driveline mode.

5. The method of claim 4, where the third mode includes operating with the torque converter unlocked and with the electric machine being the sole propulsion source providing torque to wheels of the vehicle and to increase torque converter impeller speed to engine idle speed, with no change in creep speed.

6. The method of claim 5, further comprising changing from operating in the third mode to operating in the second driveline mode in further response to an actual torque converter impeller speed minus a desired engine idle speed being less than a threshold.

7. The method of claim 6, further comprising starting the engine in response to the request to change the active driveline mode from the first driveline mode to the second driveline mode.

8. The method of claim 6, further comprising closing the driveline disconnect clutch in response to the actual torque converter impeller speed minus the desired engine idle speed being less than the threshold.

9. A driveline operating method, comprising:
via a controller, in a first driveline mode where a torque converter is locked, adjusting an electric machine torque request as a function of a wheel creep torque in a second driveline mode, the second driveline mode being a mode where the torque converter is unlocked and an engine is a sole propulsion source of a driveline providing torque to wheels of a vehicle;
adjusting torque of an electric machine responsive to the electric machine torque request when the driveline is requested to operate in the first driveline mode; and
starting an engine and coupling the engine to the electric machine while the torque converter is locked in response to a request to operate the driveline in a third driveline mode.

10. The method of claim 9, where coupling of the engine to the electric machine is performed when a speed of the engine is equal to a speed of a torque converter impeller.

11. The method of claim 10, further comprising deactivating the electric machine in response to coupling the engine to the electric machine.

12. The method of claim 10, where the engine is coupled to the electric machine via a disconnect clutch.

13. The method of claim 10, further comprising adjusting engine torque as a function of the wheel creep torque in the second driveline mode while operating the engine in the third driveline mode.

14. The method of claim 9, further comprising downshifting a gear of a transmission in response to starting the engine and a torque converter impeller speed being less than an engine idle speed.

15. The method of claim 14, further comprising not downshifting the transmission and changing to the second driveline mode when the transmission may not be downshifted.

16. A system, comprising:
an engine in a hybrid vehicle driveline;
an electric machine in the hybrid vehicle driveline;
a torque converter directly coupled to the electric machine and a transmission; and
a controller including executable instructions stored in non-transitory memory to adjust an electric machine torque as a function of a wheel creep torque in a first driveline mode where the torque converter is locked, the wheel creep torque delivered in a second driveline mode where the torque converter is unlocked.

17. The system of claim 16, further comprising additional instructions to change from the first driveline mode to the second driveline mode in response to a request to change driveline operating modes.

18. The system of claim 17, where changing from the first driveline mode to the second driveline mode includes changing to a third driveline mode.

19. The system of claim 16, further comprising additional instructions to operate in the first driveline mode with a torque converter impeller speed that is less than an engine idle speed.

20. The system of claim 16, further comprising additional instructions to change from the first driveline mode to a fourth mode where the engine is running and the electric machine is deactivated, and where the engine provides the wheel creep torque while the torque converter is locked.

* * * * *